US008570221B2

(12) United States Patent
Bao et al.

(10) Patent No.: US 8,570,221 B2
(45) Date of Patent: Oct. 29, 2013

(54) WIRELESS LOCALIZATION TECHNIQUES IN LIGHTING SYSTEMS

(75) Inventors: Xingkai Bao, Bethlehem, PA (US);
Sushanta Das, El Cerrito, CA (US);
Monisha Ghosh, Chappaqua, NY (US)

(73) Assignee: Koninklijke Philips N.V., Eindhoven (NL)

( * ) Notice: Subject to any disclaimer, the term of this patent is extended or adjusted under 35 U.S.C. 154(b) by 243 days.

(21) Appl. No.: 13/132,340

(22) PCT Filed: Nov. 16, 2009

(86) PCT No.: PCT/IB2009/055101
§ 371 (c)(1),
(2), (4) Date: Jun. 2, 2011

(87) PCT Pub. No.: WO2010/064159
PCT Pub. Date: Jun. 10, 2010

(65) Prior Publication Data
US 2012/0013508 A1 Jan. 19, 2012

Related U.S. Application Data

(60) Provisional application No. 61/120,189, filed on Dec. 5, 2008.

(51) Int. Cl.
*G01S 3/02* (2006.01)
(52) U.S. Cl.
USPC ............................................................ 342/458

(58) Field of Classification Search
USPC ........................................................ 342/458
See application file for complete search history.

(56) References Cited

U.S. PATENT DOCUMENTS

| 6,047,192 | A | 4/2000 | Maloney et al. | |
|---|---|---|---|---|
| 6,865,347 | B2 * | 3/2005 | Perkins et al. | 398/172 |
| 2004/0000881 | A1 * | 1/2004 | Flory, IV | 315/312 |
| 2006/0250980 | A1 * | 11/2006 | Pereira et al. | 370/254 |
| 2007/0154093 | A1 * | 7/2007 | Dunton et al. | 382/186 |
| 2008/0315772 | A1 * | 12/2008 | Knibbe | 315/149 |
| 2008/0316743 | A1 * | 12/2008 | Shaneour | 362/233 |
| 2010/0007558 | A1 * | 1/2010 | Bent et al. | 342/460 |

FOREIGN PATENT DOCUMENTS

WO 2006095315 A1 9/2006

\* cited by examiner

*Primary Examiner* — Harry Liu
(74) *Attorney, Agent, or Firm* — Mark L. Beloborodov

(57) ABSTRACT

The invention relates to a system and method for localization positioning in lighting systems. At least two of a Time Difference of Arrival (TDOA), Angle of Arrival (AOA), Received Signal Strength Index (RSSI) and a Position Estimation Algorithm with unified TDOA and RSSI are used to obtain localization positioning. The schemes introduce a maximum-likelihood estimation strategy incorporating a partial derivative matrix for each lighting unit using at least two reference nodes in order to achieve higher accuracy.

38 Claims, 9 Drawing Sheets

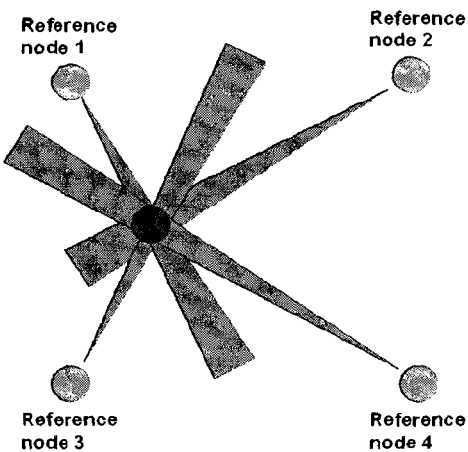
Fig. 1 – PRIOR ART
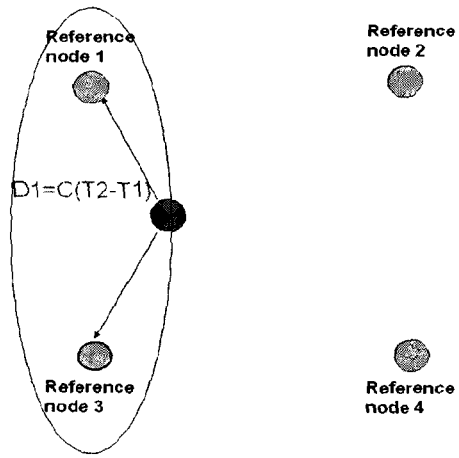
Fig. 2 – PRIOR ART

WIRELESS LOCALIZATION TECHNIQUES IN LIGHTING SYSTEMS

BACKGROUND

In illumination systems, both commercial and residential, there is an increasing interest to wirelessly control individual lighting units, such as luminaries, in the system in order to adjust the lighting and its effects. For example, in a typical greenhouse of 100×400 meters dimension, approximately 10,000 to 20,000 lighting units equipped with low-cost wireless nodes are deployed. The nodes may also reside at a location separate from the corresponding lighting unit, although together form the lighting unit or lighting unit node. All of the wireless nodes form a network, such as a mesh network, in which commands can be sent from any wireless control point (or control point node) to any node in the network. Therefore, the control point needs to know the exact location of each lighting unit in the facility. There are several known algorithms/protocols that are currently used to determine the location of each lighting unit in the system. These algorithms or protocols include: Received Signal Strength Index (RSSI), Angle-of-Arrival (AOA) and Time-Difference-of-Arrival (TDOA). Each scheme has its own advantages and drawbacks.

Wireless control of a lighting system provides many advantages in addition to the ability of remotely switching and dimming lighting units in the system. For example, such control provides a convenient way of setting up and making changes to a lighting system and of improving energy utilization. The lighting units may be of any type or combination of types, for example fluorescent, high-intensity discharge (HID), light-emitting diodes (LEDs), incandescent, etc. The ability to utilize a wide variety of products allows the system to provide features, such as emergency lighting control, which can be added without making any wiring changes. Energy utilization by the system can also be regulated by a program which can be readily modified to meet changing demands.

The RSSI based localization protocol benefits from the simplicity achieved by eliminating the need for additional hardware in wireless nodes, such that the system cost, power consumption, and physical size can be greatly reduced. However, the RSSI based localization protocol suffers from shadowing, and multi-path fading in a typical wireless environment, which limits not only the measurement accuracy but also the measurement range. The existing RSSI based localization protocols do not satisfy the large measurement range and high accuracy requirements in lighting unit systems, such as a greenhouse or commercial building.

In AOA based systems, the localization protocol uses directional antennas or antenna arrays to measure the angle or bearing relative to points located at known positions, as illustrated in FIG. 1. The intersection of several measured direction pointers yields a position value. The accuracy of the AOA approach is limited by the possible directivity of the measuring aperture, by shadowing and by multi-path reflections arriving from misleading directions. Additionally, positioning estimation error increases linearly with the localization range.

Radio frequency propagation delay based systems, such as time-of-flight (TOF) systems, rely on the precision of timing between the signal transmitter and the receiver. Therefore, high accuracy synchronization is very important in such systems. By combining at least three distances from three reference nodes, triangulation can be used to estimate a re-locatable station's location. Time Difference of Arrival (TDOA) systems, on the other hand, use the signal arrival time difference to each reference node to calculate the distance difference from the lighting unit node to each of the reference nodes, as illustrated in FIG. 2. Similar to the TOF system, distance-differences from one lighting unit to at least two reference nodes are needed to estimate the location of the lighting unit node. The TDOA approach requires high accuracy synchronization only among the reference nodes. Early-late receivers, hardware counters, and high accuracy clocks are required in the reference nodes. The lighting unit nodes do not require any additional hardware or expensive clocks. This makes the TDOA technique more practical to implement, especially if low-cost radios are employed in the network. Although TDOA systems do not require synchronization between lighting units and reference nodes, their performance is still limited by the narrow bandwidth radios in low-cost nodes.

To address some of the many disadvantages prevailing in the conventional localization based systems, there are at least three challenges to overcome: (1) there is severe multi-path fading, especially in indoor environments, which becomes an impediment to localization accuracy, (2) in order to reduce the number of reference nodes, the measurement range should be large, which further increases the difficulty to improve localization accuracy, and (3) to reduce the system cost, only a low-cost commercial radio is adopted, which has an imprecise clock and narrow bandwidth. Additionally, no hardware modification is allowed in the low-cost radio typically used in each lighting unit node. Each of these challenges requires a solution that provides a position localization system and method with improved accuracy and reduced overhead.

SUMMARY

The invention generally relates to a system and method for localization positioning in lighting systems, and having particular benefits in large scale installations (for example, commercial buildings). At least two of a Time Difference of Arrival (TDOA), Angle of Arrival (AOA), and Received Signal Strength Index (RSSI) are used along with a Position Estimation Algorithm to determine localization positioning.

In one embodiment of the invention, a method for determining a location of a lighting unit includes recording at a plurality of reference nodes a time-of-arrival of a signal transmitted from the lighting unit, and a distance-difference is calculated at each of the reference nodes. The at least two localization protocols are provided into a partial derivative matrix, in which the partial derivative matrix includes at least two sub-matrices, a first sub-matrix including partial derivatives of a measured angle-of-arrival at the reference nodes of each lighting unit with respect to x and y location, and a second sub-matrix including a partial derivative of a measured distance-difference at one of the reference nodes of the corresponding one of the lighting units with respect to x and y location.

In another embodiment of the invention, a method for determining a location of a lighting unit includes transmitting a data packet from the lighting unit, and estimating the signal strength of the transmit data packet at a plurality of reference nodes. The estimated signal strength is embedded into the data packet stored by the lighting unit in proximity to the transmitting lighting unit, and the time-of-arrival is estimated at the reference node. The data packet is decoded to obtain information about each of the lighting units, and the time-ofarrival and signal strength of the proximal lighting unit is sent to the reference node. The position estimation for each lighting unit is then calculated.

In one aspect of this embodiment, the method includes recording at each reference node a time-of-arrival signal from each lighting unit, and communicating the recording at one of the reference nodes to each of the other reference nodes. A distance-difference is then calculated at each of the reference nodes. The at least two localization protocols are then provided into a partial derivative matrix that includes at least three sub-matrices, a first sub-matrix having partial derivatives of a measured distance-difference stored at each of the reference nodes with respect to x and y locations of corresponding lighting units, a second sub-matrix having partial derivatives of a measured signal strength between two of the lighting units with respect to x and y location, and a third sub-matrix having the signal strength between each lighting unit to each of the reference nodes.

In yet another embodiment of the invention, a method for determining a location of a lighting unit includes estimating the location for each of the lighting units using TDOA information, and the location is refined at each of the lighting units using RSSI information from the other lighting units in proximity thereto. The position estimation is determined by transmitting a signal including the signal strength from each of the lighting units, including a measured RSSI, and the transmit time-of-arrival signal is recorded at each of the reference nodes from each of the lighting units. The recorded transmit time-of-arrival signal is provided to each of the other reference nodes, and the position of each lighting unit is estimated using the time-difference-of-arrival. As part of the estimation, a representative topology graph and tanner graph are produced, and message-passing occurs, where information being message-passed in the tanner graph includes the location information with different variance. The location of each lighting unit connected to the reference nodes are then computed.

The invention is also related to a system that performs the method of the invention. Additional features and advantages are described herein, and will be apparent from the following description and the figures.

BRIEF DESCRIPTION OF THE DRAWINGS

The Figures are diagrammatic and not drawn to scale. The same reference numbers in different Figures refer to like parts.

FIG. 1 is an exemplary illustration of an angle-of-arrival localization scheme known in the prior art.

FIG. 2 is an exemplary illustration of a time-difference-of-arrival localization scheme known in the prior art.

DETAILED DESCRIPTION

In lighting systems, and in particular large scale lighting systems such as greenhouses or commercial buildings, wireless nodes form a wireless network, such as a mesh network. Commands can be sent from a control point, including for example a computer, PDA, a remote control or light switch, to any lighting unit in the network. In order for the command to be sent to a lighting unit, the control point must know the location of that unit. Locations of the lighting unit(s) are determined in these systems using a localization system and method to achieve high accuracy location positioning. Such high-accuracy is determined by using a position estimation strategy, such as a maximum-likelihood (ML) position estimation strategy, that incorporates at least two localization protocols for each lighting unit, utilizing at least two reference nodes. It is appreciated, however, that two or more reference nodes may be used in the system to arrive at a similar determination. The localization system and method provide a more accurate, higher coverage range and a cost efficient scheme utilizing a unified protocol approach.

Unification of Time Difference of Arrival (TDOA) and Angle of Arrival (AOA)

In this embodiment of the invention, the TDOA and AOA protocols are used in combination to provide a localization estimation with greater accuracy and higher coverage range, as compared to conventional methods. In the exemplary system, each lighting unit or lighting unit node is capable of wireless communication. For example, each lighting unit may be equipped with an antenna, such as a single omni-directional antenna, and a low-power radio, for example a ZigBee™ radio. It is also appreciated that each lighting unit may incorporate additional hardware and/or software that enables the units to perform a variety of functions beyond light control. For example, the lighting units or lighting unit nodes may include a processor, a motion detector, alarm or any other well known device or software. The reference nodes similarly comprise any combination of hardware and software to provide functionality similar to or compatible with the lighting units or lighting unit nodes. It is also understood that the lighting unit itself could be replaced by any of the aforementioned devices and/or software.

Figure 3:
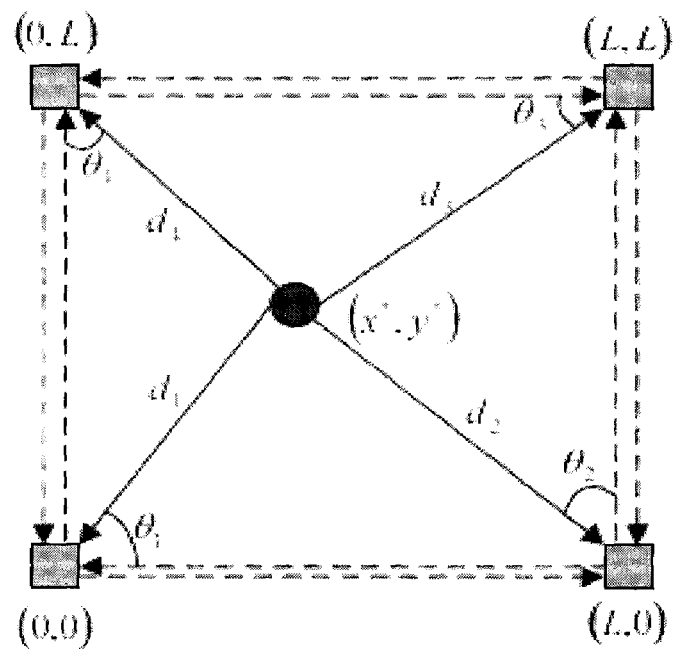
FIG. 3 illustrates the first phase of a protocol based on a unified time-difference-of-arrival and angle-of-arrival with four nodes in accordance with an embodiment of the invention.
Figure 4:
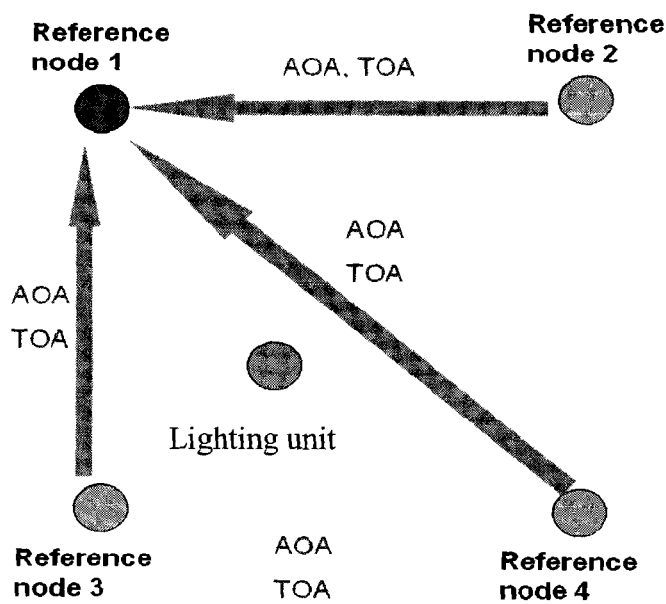
FIG. 4 illustrates the second phase of a protocol based on a unified time-difference-of-arrival and angle-of-arrival in accordance with an embodiment of the invention.

An exemplary unified TDOA and AOA based localization system is illustrated in FIG. 3. In this exemplary system, each lighting unit transmits a data packet sequentially in a time domain. Reference nodes are located at (0,0), (0,L), (L,L) and (L,0), with each reference node having an antenna array that estimates the angle-of-arrival $\theta i$, $\forall i=1, 2, 3, 4$, of the transmitted signal from each of the lighting units. One such lighting unit is shown at coordinate (x*,y*). Each reference node also records the time-of-arrival (TOA) of a signal transmit by the lighting unit, and the TOA is sent to each of the other reference nodes. Each reference node then uses the product of the TOA difference (TDOA) and the speed of light to calculate the distance difference from the lighting unit to each reference node. The TDOA and AOA information are sent to a reference node, in which the position is calculated using both the TDOA and the AOA by a position estimation method, such as the ML position estimation algorithm, as illustrated in FIG. 4. It is appreciated that multiple reference nodes could perform the calculation, although using one reference node simplifies the procedure.

Using the ML position estimation algorithm, a partial derivative matrix G is found for the unified TDOA and AOA localization protocol. The partial derivative matrix G comprises two sub-matrices known as sub-matrix A and sub-matrix B, which is the derivative matrix of the AOA and TDOA, respectively.

The matrix G takes the form, $$G = \begin{pmatrix} A \\ B \end{pmatrix}$$

For sub-matrix A, elements in the ith row are the partial derivative function of $\theta_i$ with respect to x and y respectively plugged-in with the initial coordinates (x*, y*). This is represented mathematically as:

$$A = \begin{pmatrix} \frac{\partial \theta_1}{\partial x}\Big|_{\substack{x=x^* \\ y=y^*}} & \frac{\partial \theta_1}{\partial y}\Big|_{\substack{x=x^* \\ y=y^*}} \\ \frac{\partial \theta_2}{\partial x}\Big|_{\substack{x=x^* \\ y=y^*}} & \frac{\partial \theta_2}{\partial y}\Big|_{\substack{x=x^* \\ y=y^*}} \\ \cdots & \cdots \\ \frac{\partial \theta_4}{\partial x}\Big|_{\substack{x=x^* \\ y=y^*}} & \frac{\partial \theta_4}{\partial y}\Big|_{\substack{x=x^* \\ y=y^*}} \end{pmatrix}$$

For the sub-matrix B, the elements in the ith row are the partial derivative function of the ith pair distance difference gi from the lighting unit to each reference node respect to x and y respectively plugged-in with the initial coordinates (x*,y*). This is represented mathematically as:

$$B = \begin{pmatrix} \frac{\partial g_1}{\partial x}\Big|_{\substack{x=x^* \\ y=y^*}} & \frac{\partial g_1}{\partial y}\Big|_{\substack{x=x^* \\ y=y^*}} \\ \frac{\partial g_2}{\partial x}\Big|_{\substack{x=x^* \\ y=y^*}} & \frac{\partial g_2}{\partial y}\Big|_{\substack{x=x^* \\ y=y^*}} \\ \cdots & \cdots \\ \frac{\partial g_4}{\partial x}\Big|_{\substack{x=x^* \\ y=y^*}} & \frac{\partial g_4}{\partial y}\Big|_{\substack{xn=x^* \\ y=y^*}} \end{pmatrix}$$

The maximum-likelihood position estimation of each lighting unit is:

$$(x,y)=(x^*,y^*)+(G^T N^{-1} G)^{-1} G^T N^{-1}(r(x^*,y^*))$$

where, 'N' is the covariance matrix of the total error vector and r(.) is an eight dimension column vector represented as $$r(x, y) = \begin{pmatrix} \bar{\theta} - \theta(x, y) \\ \bar{g} - g(x^*, y^*) \end{pmatrix}$$

The practical localization is an iterative process:

$$\begin{cases} \langle x, y \rangle^{(0)} = \langle L/2, L/2 \rangle & l \neq 0 \\ \langle x, y \rangle^{(l)} = \langle x, y \rangle^{(l-1)} + (G^T N^{-1} G)^{-1} G^T N^{-1} r & l > 0 \end{cases}$$

Each row of sub-matrix A encompasses the partial derivatives of the measured angle-of-arrival at a reference node from a particular lighting unit with respect to the x and y locations of that specific lighting unit. In this embodiment, four reference nodes are used, one in each corner of the L×L (e.g. 100×400) meters rectangular grid. Therefore, each lighting unit will contribute to a 4×2 dimensional sub-matrix A.

Each reference node records the signal TOA from each lighting unit and communicates recorded information to other reference nodes. Each reference node then calculates the 'distance-difference (g)', which is a product of the TDOA between two reference nodes and the speed of light. The sub-matrix B comprises of the partial derivates of the measured distance-differences at each reference node with respect to the x and y locations of a particular lighting unit. Therefore, each lighting unit will result in a maximum of 4×2 dimensional sub-matrix B.

Figure 5:
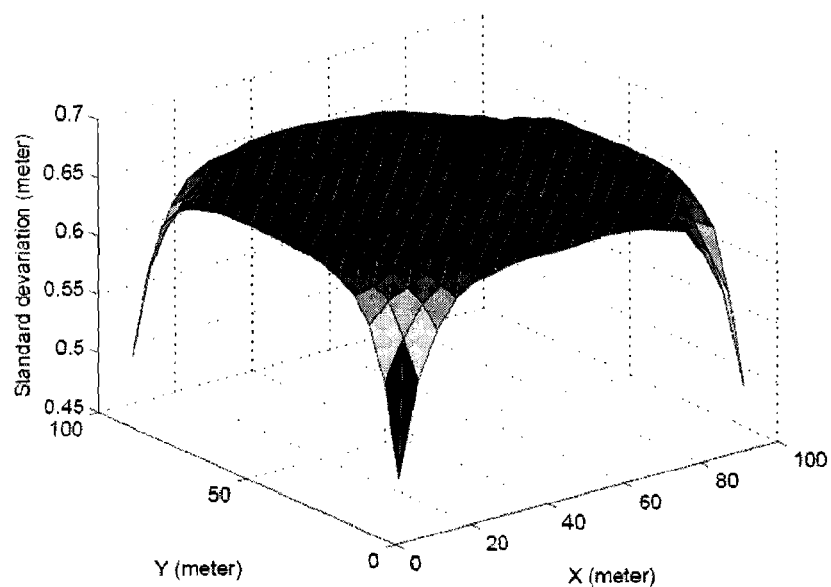
FIG. 5 illustrates simulation results using a unified time-difference-of-arrival and angle-of-arrival protocol with four reference nodes and no frequency diversity.
Figure 6:
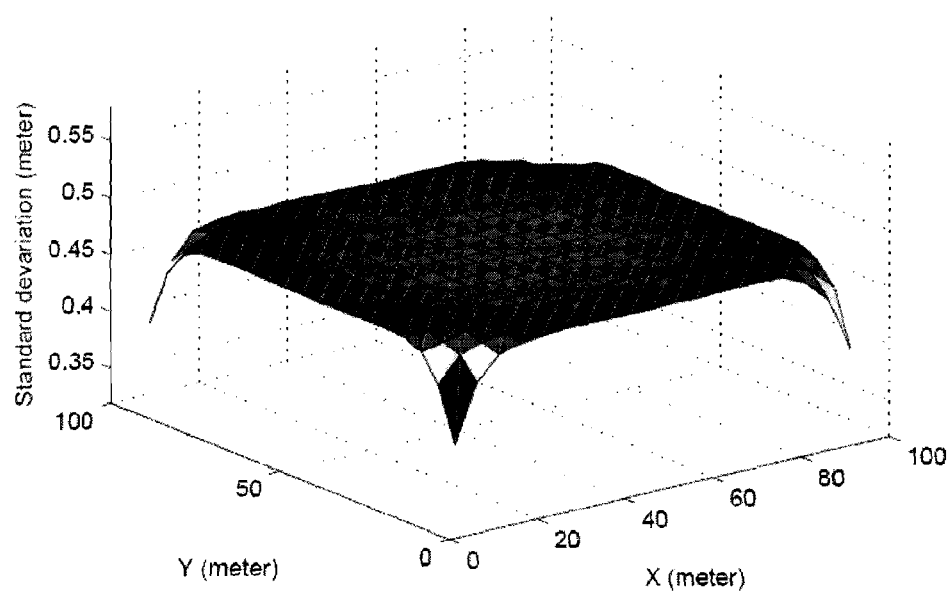
FIG. 6 illustrates simulation results using a unified time-difference-of-arrival and angle-of-arrival protocol with four reference nodes and two frequency diversity.

FIG. 5 shows results using the unified TDOA and AOA protocol without frequency diversity. Localization performance is illustrated, in the exemplary embodiments, by using four reference nodes in the four corners of a 100×100 meters rectangular grid. In this example, an antenna array can estimate the angle-of-arrival with an accuracy of three degrees standard deviation. The results demonstrate a significant reduction in the localization errors found individually compared to traditional TDOA and AOA methods. Referring to the middle of the graph, 0.65 meters accuracy is obtained, and at the four corners the accuracy reaches 0.5 meters. To increase accuracy even further, different frequency sub-channels in the radio can be used to estimate the location and calculate the average position to achieve extra frequency diversity. FIG. 6 shows results for the unified TDOA and AOA using two-frequency diversity. Here, the error standard deviation does not exceed 0.5 meters in the middle, the four edges or the four corners.

Figure 7:
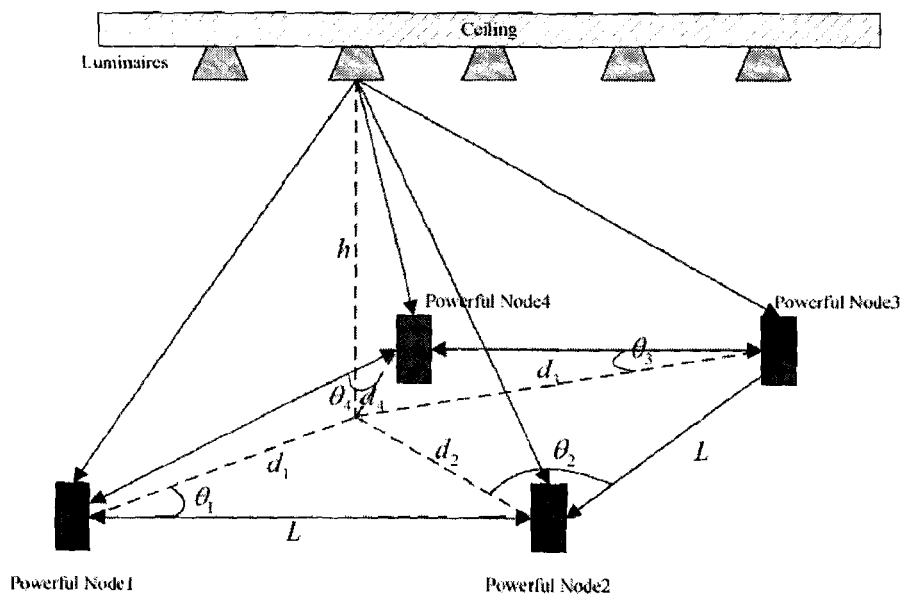
FIG. 7 illustrates a three dimensional view with elevated nodes using a unified time-difference-of-arrival and angle-of-arrival protocol.

In another embodiment of the invention, as illustrated in FIG. 7, reference nodes are located in an elevated position from the ground, as opposed to the typical location on the ceiling. Locating the nodes in this position improves the line-of-sight of the channel between lighting unit nodes and reference nodes. This provides better accuracy in TDOA and AOA measurements without any additional system complexity.

Unification of Time Difference of Arrival (TDOA) and Received Signal Strength Index (RSSI)

In another embodiment of the invention, a unified TDOA and RSSI are used in combination to provide a localization estimation with greater accuracy and higher coverage range, as compared to conventional methods. In the exemplary system, each lighting unit is capable of wireless communication. For example, each lighting unit may be equipped with an antenna, such as a single omni-directional antenna, and a low-power radio, for example a ZigBee™ radio. It is also appreciated that each lighting unit may incorporate additional hardware and/or software that enables the units to perform a variety of functions beyond light control. For example, the lighting units or lighting unit nodes may include a processor, a motion detector, an alarm or any other well known device or software. The reference nodes similarly comprise any combination of hardware and software to provide functionality similar to the lighting units or lighting unit nodes. It is also understood that the lighting unit itself could be replaced by any of the aforementioned devices and/or software.

Figure 8:
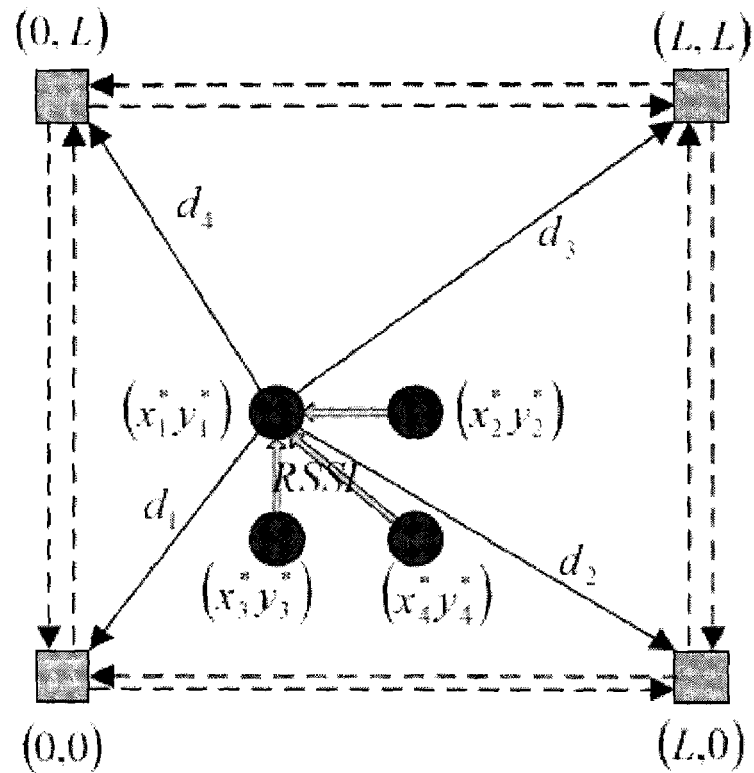
FIG. 8 illustrates the fundamental principle of the protocol based on a unified time-difference-of-arrival and neighboring received-signal-strength index with four nodes in accordance with an embodiment of the invention.
Figure 9:
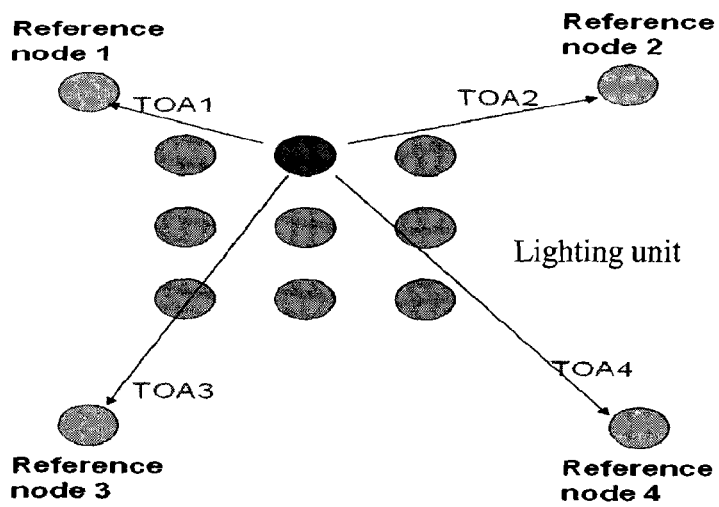
FIG. 9 illustrates the time-of-arrival recording in each of four reference nodes when the lighting units transmit in the protocol based on a unified time-difference-of-arrival and neighboring received-signal-strength index in accordance with one embodiment of the invention.
Figure 10:
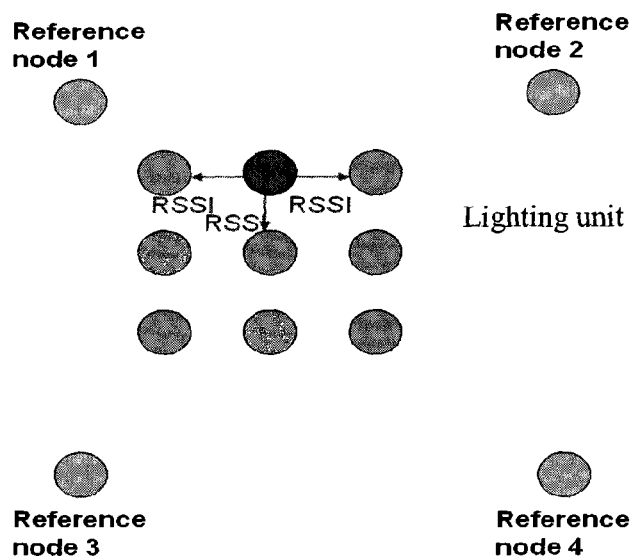
FIG. 10 illustrates neighboring nodes estimating the received-signal-strength index when one lighting unit transmits in the protocol based on a unified time-difference-of-arrival and neighboring received-signal-strength.
Figure 11:
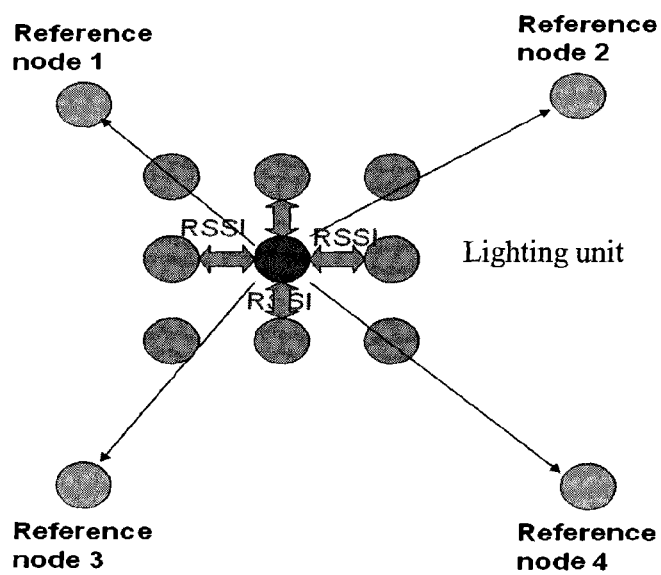
FIG. 11 illustrates an embodiment of the invention wherein each lighting unit includes the neighboring nodes received-signal-strength index information in its transmit packet in the protocol based on a unified time-difference-of-arrival and neighboring received-signal-strength index in accordance with the invention.
Figure 12:
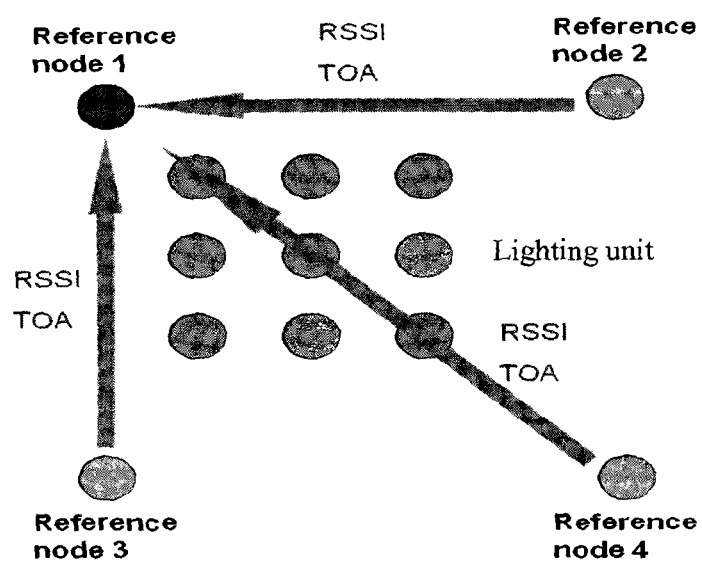
FIG. 12 illustrates a reference node collecting the time-of-arrival and neighboring received-signal-strength index information in the protocol based on a unified time-difference-of-arrival and neighboring received-signal-strength index in accordance with an embodiment of the invention.

An exemplary unified TDOA and RSSI based localization system is illustrated in FIG. 8. In the exemplary system each lighting unit sequentially transmits a data packet, as illustrated in FIG. 9. Other lighting unit that have not transmitted, listen to the transmit packet, estimate the signal strength and record the RSSI, as illustrated in FIG. 10. The RSSI is then embedded in the data packet stored in lighting units, which are in close proximity of the transmitting lighting unit. Hence, each lighting unit transmits the RSSI from neighboring lighting units which have previously transmitted, as shown in FIG. 11. A reference node then estimates the TOA of each lighting unit, and decodes the data packet sent from each lighting unit in order to obtain the recorded RSSI between each of the lighting units and its neighboring lighting units. All of the accumulated information in the reference nodes regarding TOA and RSSI data from all lighting unit nodes are transferred to one of the reference nodes, as shown in FIG. 12, where a position estimation method, such as the ML position estimation algorithm, for each lighting unit is performed. The RSSI is obtained without requiring any extra packet or any new hardware.

The ML position estimation algorithm uses both the TDOA and neighboring nodes (i.e. neighboring lighting units) RSSI information. The actual location for each neighboring lighting unit is defined as (x,y), where x and y are m dimensional column vectors for m neighboring lighting units. To find the ML position estimation, a partial derivative matrix G for the unified TDOA and neighboring RSSI localization protocol is used. The derivative matrix G comprises of three sub-matrices: sub-matrix A, sub-matrix B and sub-matrix C.

The derivative matrix G takes the form, $$G = \begin{pmatrix} A \\ B \\ C \end{pmatrix}$$

The sub-matrices A, B, C are the derivative matrices of TDOA, RSSI between each lighting unit and its neighboring lighting units and RSSI between each lighting unit and reference nodes. The derivative matrix of TDOA is written in m sub-matrix, where each sub-matrix is the derivative matrix for each neighboring lighting units as:

$$A = \begin{pmatrix} A_1 & & & \\ & A_2 & & \\ & & \ldots & \\ & & & A_m \end{pmatrix}$$

The derivative matrix for the ith lighting unit is written as:

$$A_i = \begin{pmatrix} \frac{\partial f_1}{\partial x_i}\big|_{\substack{x_i=x_i^*\\y_i=y_i^*}} & \frac{\partial f_1}{\partial y_i}\big|_{\substack{x_1=x_i^*\\y_i=y_i^*}} \\ \frac{\partial f_2}{\partial x_i}\big|_{\substack{x_i=x_i^*\\y_i=y_i^*}} & \frac{\partial f_2}{\partial y_i}\big|_{\substack{x_n=x_i^*\\y_i=y_i^*}} \\ \ldots & \ldots \\ \frac{\partial f_4}{\partial x_i}\big|_{\substack{x_i=x_i^*\\y_i=y_i^*}} & \frac{\partial f_4}{\partial y_i}\big|_{\substack{x_n=x_i^*\\y_i=y_i^*}} \end{pmatrix}$$

The sub-matrix B, represents partial derivatives of the RSSI between each lighting unit and its neighboring lighting units. Hence, each row of sub-matrix B encompasses the partial derivatives of the measured RSSI between two neighboring lighting units with respect to their x and y locations. Therefore, the derivate matrix B has dimension $$\binom{m}{2} \times 2m.$$

The matrix is defined as:

$$B = \begin{pmatrix} B_{1,2} \\ \ldots \\ B_{1,m} \\ \ldots \\ B_{k,k+1} \\ \ldots \\ B_{k,m} \\ \ldots \\ B_{m-2,m-1} \\ B_{m-2,m} \\ B_{m-1,m} \end{pmatrix}$$

The derivative matrix C is for the RSSI between each lighting unit and each reference node, which can be written in m sub-matrix, where each sub-matrix is the derivative matrix for each neighboring lighting unit, as:

$$C = \begin{pmatrix} C_1 & & & \\ & C_2 & & \\ & & \ldots & \\ & & & C_m \end{pmatrix}$$

For each sub-matrix $C_i$, the matrix is expressed as:

$$C_i = \begin{pmatrix} \frac{\partial h_1}{\partial x_i}\Big|_{\substack{x_i=x_i^*\\y_i=y_i^*}} & \frac{\partial h_1}{\partial y_i}\Big|_{\substack{x_i=x_i^*\\y_i=y_i^*}} \\ \frac{\partial h_2}{\partial x_i}\Big|_{\substack{x_i=x_i^*\\y_i=y_i^*}} & \frac{\partial h_2}{\partial y_i}\Big|_{\substack{x_i=x_i^*\\y_i=y_i^*}} \\ \cdots & \cdots \\ \frac{\partial h_4}{\partial x_i}\Big|_{\substack{x_i=x_i^*\\y_i=y_i^*}} & \frac{\partial h_4}{\partial y_i}\Big|_{\substack{x_i=x_i^*\\y_i=y_i^*}} \end{pmatrix}$$

The ML position estimation of each lighting unit is as follows:

$$(x,y)=(x^*,y^*)+(G^T N^{-1} G)^{-1} G^T N^{-1}(r(x^*,y^*))$$

where, 'N' is the covariance matrix of the total error vector and r(.) is an eight dimension column vector represented as $$r(x, y) = \begin{pmatrix} \overline{\theta} - \theta(x, y) \\ \overline{g} - g(x^*, y^*) \end{pmatrix}$$

The practical localization in the unified TDOA and neighboring RSSI algorithm is an iterative process:

$$\begin{cases} \langle x, y \rangle^{(0)} = \langle L/2, L/2 \rangle & l \neq 0 \\ \langle x, y \rangle^{(l)} = \langle x, y \rangle^{(l-1)} + (G^T N^{-1} G)^{-1} G^T N^{-1} r & l > 0 \end{cases}$$

Every reference node records the signal TOA from each lighting unit and communicates stored information to other reference nodes. Each reference node then calculates the 'distance-difference' $f_i$, $\forall i=1, 2, 3, 4$, which is a product of the 'time-difference-of-arrival' between two reference nodes and the speed of light. The sub-matrix A comprises the partial derivatives of the measured distance-differences at each reference node with respect to the x and y locations of a particular lighting unit. Therefore, each lighting unit will result in a maximum of 4×2 dimensional sub-matrix A.

The sub-matrix C is for the RSSI between each lighting unit and each reference node. Each reference node records the RSSI $h_i$, $\forall i=1, 2, 3, 4$ for each lighting unit. In this example, four reference nodes are used as illustrated in FIG. 9, one in each corner of the 100×400 meters rectangular grid. Therefore, each lighting unit will contribute to a 4×2 dimensional sub-matrix C.

Figure 13:
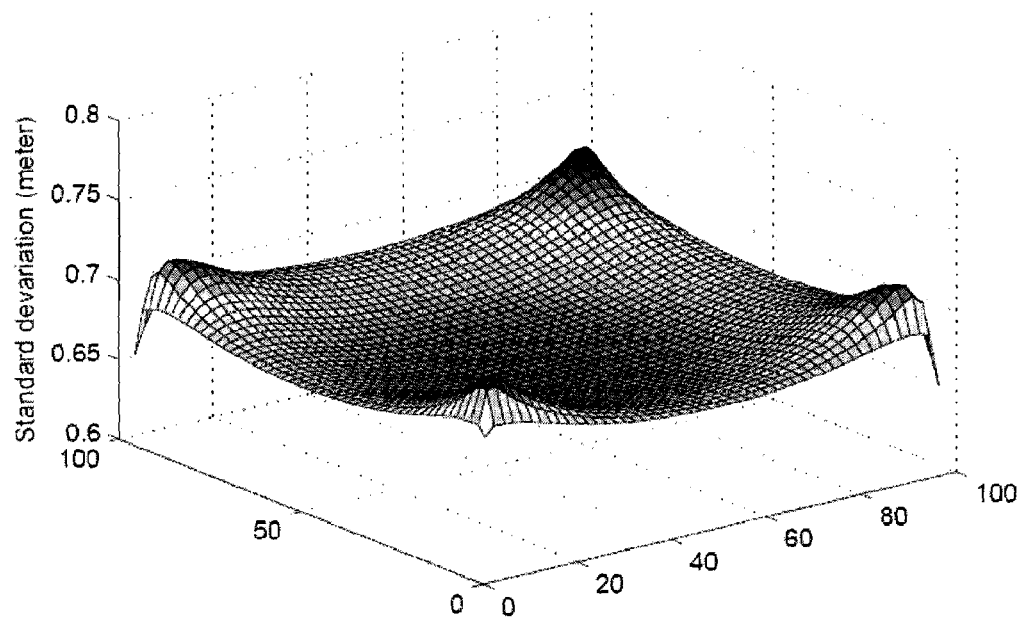
FIG. 13 illustrates simulation results using a unified time-difference-of-arrival and received-signal-strength-index protocol with four reference nodes and two antennas in each node.
Figure 14:
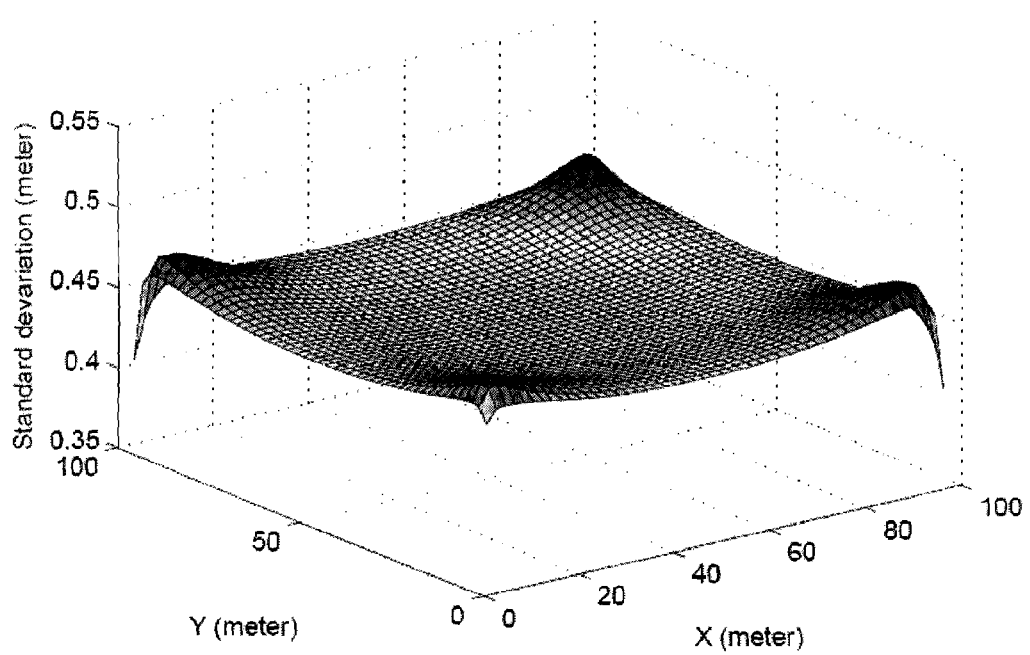
FIG. 14 illustrates simulation results using a unified time-difference-of-arrival and received-signal-strength-index protocol with four reference nodes and two antennas in each node.

Localization performance is illustrated in the exemplary embodiments using four reference nodes in each of four corners of a 100×100 meters grid, and two receiving antennas in each reference node, with 2×2 neighboring nodes (FIG. 13) or 3×3 neighboring nodes (FIG. 14). In the first instance, where 2×2 neighboring nodes help each other refine their location, the middle of the resultant graph obtains 0.7 meters accuracy. In the second instance, where 3×3 neighboring nodes help each other, the middle of the resultant graph achieves 0.47 meters accuracy. Localization accuracy can be further enhanced, for example, by increasing the number of lighting units in a given neighborhood.

Similar to the TDOA and AOA protocol, the reference nodes may be located in an elevated position from the ground, as opposed to the typical location on the ceiling.

Unified TDOA and RSSI Based Localization Method with Improved Accuracy and Reduced Complexity In the previously described unified TDOA and neighboring RSSI protocol, the maximum-likelihood (ML) position estimation algorithm is used. The ML position estimation algorithm has a computational complexity of 'm cubed', where 'm' is the number of neighboring nodes. The high order of complexity respective to 'm' limits the number of neighboring nodes that can be used to accurately detect the position of the lighting units. However, since systems of this nature typically have a large number of nodes in a dense area, the limitation on the number of neighboring nodes wastes the potential of higher localization accuracy.

In this embodiment, a different position estimation algorithm for unified TDOA and neighboring RSSI protocol is introduced. This position estimation algorithm (hereinafter, "position estimation algorithm" or "algorithm") can use all of the RSSI information between neighboring nodes with only linear computational complexity respective to the number of neighboring nodes. The algorithm (or method) is simple and has nearly optimal performance.

Additionally, this algorithm can be applied in a distributed and de-centralized manner.

Figure 15A:
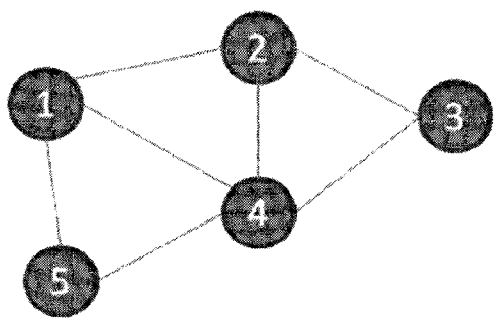
FIG. 15a illustrates a topology graph in accordance with one embodiment of the invention.
Figure 15B:
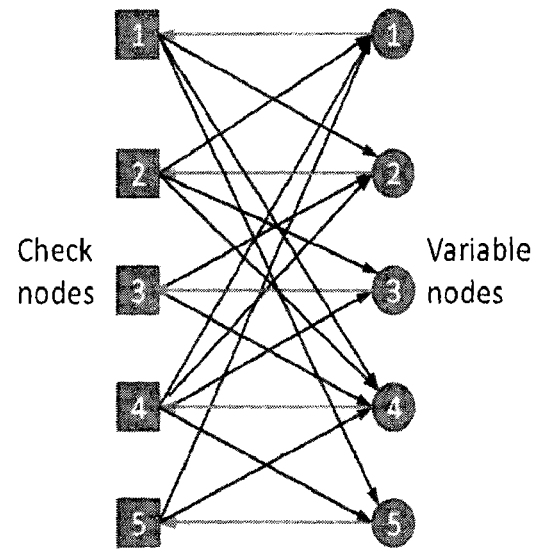
FIG. 15b illustrates a tanner graph in accordance with one embodiment of the invention.

The position estimation algorithm in this embodiment is derived from the message-passing decoding algorithm of the low-density parity-check (LDPC) channel codes. With reference to FIGS. 15a and 15b, a network connectivity graph is converted to a Tanner graph, which is conventionally used for LDPC decoding. In the network connectivity graph of FIG. 15a, each wireless node 1 to 5 in the network is made to correspond to respective check node (where position information is calculated) and variable nodes (where information from different paths are combined). One edge is connected between each corresponding check and variable node. If the RSSI between two nodes is stronger than a pre-defined threshold, an edge is added between the two corresponding variable and check nodes.

Once a Tanner graph is constructed, as illustrated for example in FIG. 15b, the graph is used to perform a message-passing position estimation according to the following procedure:

Step 1: The ML position estimation using the TDOA for each node is calculated. The calculated position using the TDOA is used as the channel likelihood ratio (LLR) in LDPC decoding, where each edge uses the position from the TDOA as the initial output.

Step 2: Each check node uses the output of the connected edge and the RSSI between the two nodes expressed by the edge as the input and performs the ML estimation. The position for each variable node is output on the edge.

Step 3: Each variable node performs a maximal ratio combining using the edge output position and the initial position calculated from the TDOA. If the maximum number of iterations is exceeded (for example, a predefined constant such as 5), the process is stopped and the final position output is given. Otherwise, the output of each edge is set to the maximal ratio combined position.

As with the design of LDPC codes, short cycles in the Tanner graph are problematic. The short cycles of girth 4 therefore significantly reduce the system performance. Hence, construction of the Tanner graph should delete the edge that causes short cycles.

An example is provided below with reference to FIGS. 15a and 15b. In this example, check node 1 is connected to variable nodes 2, 4 and 5. Since check nodes and variable nodes with the same index (for example, check node 1 and variable node 1) are the same entity, they have access to the same information, such as the initial TDOA position with variance, and the maximal ratio combined position with variance after the iterations. Variable nodes 2, 4 and 5, on the other hand, each have an initial TDOA position estimate and convey information to their respective check nodes, i.e. check nodes 2, 4 and 5. At the same time, the measured RSSI between variable nodes 2, 4 and 5 and the check node 1 will also be conveyed to respective check nodes 2, 4 and 5. Check nodes 2, 4 and 5 will then pass the information to variable node 1, which is the same as check node 1. Therefore, check node 1 acquires all of the following information: initial position estimates of nodes 2, 4 and 5, and the measured RSSI at nodes 2, 4 and 5 from node 1. Check node 1 will use the information and form the partial derivative matrix 'G' (which is same one as the sub-matrix A in the unified TDOA and RSSI schemes), comprised of the partial derivatives of the RSSI between nodes 1 to 2, 1 to 4 and 1 to 5. The maximum likelihood position estimation at check node 1 is as follows:

$$(x,y)=(x^*,y^*)+(G_i^T N^{-1} G_i)^{-1} G_i^T N^{-1}(r(x^*,y^*)),$$

where (x,y) are the positions of node 2, 4 and 5 to be calculated. Hence, in this example, the partial derivative matrix is a 3×2 matrix;

(x*, y*) are the initial TDOA position estimates of nodes 2, 4 and 5, also a 3×2 matrix in this example; and 'G' is the partial derivative matrix of size 3×6, since node 1 is connected to 3 nodes (namely, nodes 2, 4 and 5) and has two dimensions (x and y) for each RSSI measurement partial derivatives.

As a result of the calculations based on the position estimation algorithm, check node 1 provides a refined position estimate for nodes 2, 4 and 5, which is more accurate than the initial TDOA based estimation. Check node 1 will deliver the information to variable node 1. Similarly, each other check node will perform position estimation using an initial TDOA and RSSI partial derivative matrix. It should be noted that each variable node may receive more than one position estimation for each node. That is, each variable node may receive position estimation from each check node it is connected to. The variable nodes will then combine (e.g. maximal ratio combination) the information passed from all connected check nodes to output the accurate position estimate of different nodes. Although check and variable nodes are used in this example, it is understood that calculations are performed at the reference node(s).

It should also be noted that this embodiment provides significant differences and advantages from the earlier described embodiments. For example:

While the message-passing algorithm estimates the position of each node using the TDOA information, instead of a maximum-likelihood algorithm, the reference node can also use, for example, a simple MMSE estimation method.

The approximate position of each node is further refined using additional RSSI information from all neighboring nodes. Each lighting unit then transmits a signal, which includes the measured RSSI at that unit from all of its preceding units. Therefore, the reference nodes have the RSSI measurements of all and between any two of the lighting units.

Each reference node records the signal (transmitted signal) TOA from each lighting unit and shares the information among other reference nodes. One of the reference nodes is assigned to perform the computation, which uses the TDOA for each lighting unit to estimate its position.

The reference node (assigned to perform all processes) has the RSSI information between any two nodes. Hence, it can produce the topology (network) and Tanner graphs (FIGS. 15a and 15b) as part of the algorithm.

As a result of the connectivity among the lighting units, as represented in the Tanner graph (FIG. 15b), each check node can compute the position of other nodes that are connected thereto.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method for determining a location of at least one lighting unit in a lighting system, comprising:
    transmitting a signal from the at least one lighting unit;
    estimating the location of the at least one lighting unit using at least two localization protocols and a position estimation method;
    recording at least one of a plurality of reference nodes a time-of-arrival signal from each of the at least one lighting units;
    communicating the recording from the at least one of a plurality of reference nodes to each of the other reference nodes;
    calculating at each of the reference nodes the distance-difference; and
    providing the at least two localization protocols into a derivative matrix.

2. The method of claim 1, wherein the partial derivative matrix comprises at least two sub-matrices,
    a first sub-matrix including partial derivatives of a measured angle-of-arrival at the reference nodes of each of the at least one lighting units with respect to x and y location, and
    a second sub-matrix including a partial derivative of a measured distance-difference at one of the reference nodes of a corresponding one of the at least one lighting units with respect to x and y location.

3. The method of claim 1, wherein the partial derivate matrix is defined as:

$$G = \begin{pmatrix} A \\ B \end{pmatrix}.$$

4. The method of claim 3, wherein the position estimation of each of the at least one lighting units is defined as:

$$(x,y)=(x^*,y^*)+(G^T N^{-1} G)^{-1} G^T N^{-1}(r(x^*,y^*)).$$

5. The method of claim 1, the reference nodes are located in a position elevated from ground level to provide an improved line-of-sight.

6. The method of claim 1, wherein the position estimation algorithm is a maximum-likelihood position estimation algorithm.

7. The method of claim 1, further comprising:
    transmitting a data packet from the at least one lighting unit; and
    estimating a signal strength of the data packet transmit by the at least one lighting unit and by each of the other at least one lighting units at a plurality of reference nodes.

8. The method of claim 7, further comprising:
embedding the estimated signal strength into the data packet stored by the other at least one lighting units in proximity to the transmitting lighting unit;
estimating the time-of-arrival at the reference nodes and decoding the data packet to obtain information about each of the at least one lighting units;
sending the time-of-arrival and signal strength from the proximal at least one lighting unit to the reference nodes; and
calculating a position estimation for each of the at least one lighting units.

9. The method of claim 8, further comprising:
recording at each of the reference nodes a time-of-arrival signal from each of the at least one lighting units;
communicating the recording at one of the reference nodes to each of the other reference nodes; and
calculating at each of the reference nodes the distance-difference.

10. The method of claim 9, further comprising providing the at least two localization protocols into a partial derivative matrix.

11. The method of claim 10, wherein the partial derivative matrix comprises at least three sub-matrices,
a first sub-matrix comprising partial derivatives of a measured distance-difference at each of the reference nodes with respect to x and y locations of a corresponding one of the at least one lighting units,
a second sub-matrix comprising partial derivatives of a measured signal strength between two of the at least one lighting units with respect to x and y location, and
a third sub-matrix comprising the signal strength between each of the at least one lighting units to each of the reference nodes.

12. The method of claim 10, wherein the partial derivative is defined as:

$$G = \begin{pmatrix} A \\ B \\ C \end{pmatrix}.$$

13. The method of claim 12, wherein the position estimation of each at least one lighting units is defined as:

$(x,y) = (x^*, y^*) + (G^T N^{-1} G)^{-1} G^T N^{-1} (r(x^*, y^*)).$

14. The method of claim 9, wherein the reference nodes are located in a position elevated from ground level to provide an improved line-of-sight.

15. The method of claim 1, wherein the position estimation comprises:
estimating the location of each of the at least one lighting units using TDOA information; and
refining the location of each of the at least one lighting units using RSSI information from other of the at least one lighting units in proximity thereto.

16. The method of claim 15, wherein the position estimation further comprises:
transmitting a signal including the signal strength and the RSSI information from each of the at least one lighting units;
recording the transmit time-of-arrival signal at each of the reference nodes from each of the at least one lighting units, and providing the recorded transmit time-of-arrival signal to each of the other reference nodes; and
estimating the position of each of the at least one lightings unit using the time-difference-of-arrival.

17. The method of claim 16, wherein the position estimation further comprises:
producing a representative network connectivity graph and tanner graph, and message-passing, wherein information being message-passed in the tanner graph includes the location information with difference variance; and
computing the location of each of the at least one lighting unit connected to the reference nodes.

18. The method of claim 17, further comprising providing the at least two localization protocols into a partial derivative matrix.

19. The method of claim 18, wherein the refined position estimation is defined as:

$(x,y) = (x^*, y^*) + (G_i^T N^{-1} G_i)^{-1} G_i^T N^{-1} (r(x^*, y^*)),$ wherein
(x,y) are the positions of node to be calculated;
(x*,y*) are the initial TDOA position estimates of nodes; and
'G' is the partial derivative matrix.

20. The method of claim 8, wherein the position estimation algorithm is the maximum-likelihood estimation algorithm or the MMSE estimation algorithm.

21. A lighting system for determining a location of at least one lighting unit, comprising:
at least one reference node estimating the location of the at least one lighting unit using at least two localization protocols and a position estimation method, wherein the at least one reference node:
records a time-of-arrival signal from each of the at least one lighting units;
communicates the recording from one of the at least one reference nodes to each of the other at least one reference nodes; and
calculates the distance-difference;
and wherein the at least two localization protocols are provided into a partial derivative matrix comprising at least two sub-matrices, a first sub-matrix including partial derivatives of a measured angle-of-arrival at the at least one reference node of each of the at least one lighting units with respect to x and y location, and a second sub-matrix including a partial derivative of a measured distance-difference at one of the at least one reference nodes of a corresponding one of the at least one lighting units with respect to x and y location.

22. The system of claim 21, wherein the partial derivate matrix is defined as:

$$G = \begin{pmatrix} A \\ B \end{pmatrix}.$$

23. The system of claim 22, wherein the position estimation of each of the at least one lighting units is defined as:

$(x,y) = (x^*, y^*) + (G^T N^{-1} G)^{-1} G^T N^{-1} (r(x^*, y^*)).$

24. The system of claim 21, wherein the at least one reference node is located in a position elevated from ground level to provide an improved line-of-sight.

25. The system of claim 21, wherein the position estimation algorithm is a maximum-likelihood position estimation algorithm.

26. The system of claim 21, wherein
the at least one lighting unit transmits a data packet, and
the at least one reference node estimates a signal strength of the data packet transmit by the at least one lighting unit and by each of the other at least one lighting units.

27. The system of claim 26, wherein
the at least one lighting unit that is transmitting embeds the estimated signal strength into the data packet of the other at least one lighting units in proximity thereto,
the at least one reference node estimates the time-of-arrival and decodes the data packet to obtain information about each of the at least one lighting units,
the proximal at least one lighting unit sends the time-of-arrival and signal strength to the at least one reference node, and
the at least one reference node calculates a position estimation for each of the at least one lighting unit.

28. The system of claim 27, wherein
the at least one reference node records a time-of-arrival signal from each of the at least one lighting units,
the at least one reference node communicates the recording to each of the other a least one reference nodes, and
the at least one reference node calculates the distance-difference.

29. The system of claim 28, wherein the at least two localization protocols are provided into a partial derivative matrix comprising at least three sub-matrices,
a first sub-matrix comprising partial derivatives of a measured distance-difference at each of the at least one reference nodes with respect to x and y locations of a corresponding at least one lighting unit,
a second sub-matrix comprising partial derivatives of a measured signal strength between two of the at least one lighting units with respect to x and y location, and
a third sub-matrix comprising the signal strength between each of the at least one lighting units to each of the at least one reference nodes.

30. The system of claim 29, wherein the partial derivative is defined as:

$$G = \begin{pmatrix} A \\ B \\ C \end{pmatrix}.$$

31. The system of claim 29, wherein the position estimation of each at least one lighting unit is defined as $$(x,y)=(x^*,y^*)+(G^T N^{-1} G)^{-1} G^T N^{-1}(r(x^*,y^*)).$$

32. The system of claim 21, wherein the at least one reference node is located in a position elevated from ground level to provide an improved line-of-sight.

33. The system of claim 21, wherein the position estimation is calculated at the at least one reference node and comprises:
estimating the location of each of the at least one lighting units using TDOA information; and
refining the location of each of the at least one lighting units using RSSI information from other of the at least one lighting units in proximity thereto.

34. The system of claim 33, wherein the position estimation calculation further comprises:
the at least one lighting unit transmitting a signal including the signal strength and the RSSI information;
the at least one reference node recording the transmit time-of-arrival signal from each of the at least one lighting units, and providing the recorded transmit time-of-arrival signal to each of the other reference nodes; and
the at least one reference node estimating the position of each of the at least one lighting units using the time-difference-of-arrival.

35. The system of claim 34, wherein the position estimation calculated at the at least one reference node further comprises:
producing a representative topology graph and tanner graph, and message-passing, wherein information being message-passed in the tanner graph includes the location information with difference variance; and
computing the location of each of the at least one lighting unit connected to the at least one reference node.

36. The system of claim 35, wherein the at least two localization protocols is provided into a partial derivative matrix.

37. The system of claim 36, wherein the refined position estimation is defined as:

$$(x,y)=(x^*,y^*)+(G_i^T N^{-1} G_i)^{-1} G_i^T N^{-1}(r(x^*,y^*)),$$

wherein
(x,y) are the positions of node to be calculated;
(x*,y*) are the initial TDOA position estimates of nodes; and
'G' is the partial derivative matrix.

38. The system of claim 21, wherein the position estimation algorithm is the maximum-likelihood estimation algorithm or the MMSE estimation algorithm.

* * * * *